United States Patent [19]

Brongersma

[11] Patent Number: 4,466,818

[45] Date of Patent: Aug. 21, 1984

[54] DOUBLE CRUCIBLE METHOD OF FABRICATING OPTICAL FIBERS

[75] Inventor: Hidde H. Brongersma, Waalre, Netherlands

[73] Assignee: U.S. Philips Corporation, New York, N.Y.

[21] Appl. No.: 387,919

[22] Filed: Jun. 14, 1982

[30] Foreign Application Priority Data

Jun. 16, 1981 [NL] Netherlands .................. 8102878

[51] Int. Cl.³ .................. C03B 5/02; C03B 5/26; C03B 5/44; C03B 37/09
[52] U.S. Cl. .................. 65/3.13; 65/3.14; 65/121; 65/356; 65/374.13
[58] Field of Search .................. 65/3.13, 3.14, 145, 65/356, 374.13; 65/121

[56] References Cited

U.S. PATENT DOCUMENTS

| | | | |
|---|---|---|---|
| 2,714,622 | 8/1955 | McMullen | 65/356 UX |
| 2,992,517 | 7/1961 | Hicks, Jr. | 65/3.13 |
| 3,937,625 | 2/1976 | Stewart | 65/136 |
| 4,101,305 | 7/1978 | Midwinter et al. | 65/145 |
| 4,133,664 | 1/1979 | Aulich et al. | 65/3.13 |

Primary Examiner—Richard V. Fisher
Attorney, Agent, or Firm—Marc D. Schechter

[57] ABSTRACT

A method of fabricating an optical fiber by means of the double crucible method. A double crucible is used of which at least the inner crucible has a double-walled construction. The double wall accommodates a metal wire coil. During the fabrication of the optical fiber the core glass is heated by means of a high-frequency electric field and the crucible wall is cooled with a cooling liquid.

5 Claims, 2 Drawing Figures

DOUBLE CRUCIBLE METHOD OF FABRICATING OPTICAL FIBERS

BACKGROUND OF THE INVENTION

The invention relates to a method of continuously fabricating optical fibers from a core glass and at least one cladding glass. The method uses an apparatus comprising two or more concentric crucibles (the "double crucible" method). The invention further relates to stepped index and graded index fibers obtained by this method and to an apparatus comprising at least two crucibles for use in this method.

The "double crucible" method is a known technique for the continuous production of optical fibers of the graded index type as well as of the stepped index (monomode and multimode) type. The double crucible method utilizes an arrangement of at least two, usually concentrically arranged melting vessels, each having an opening in its bottom. These openings are arranged on one line. In most cases, the contents of the vessels are heated to the operational temperature by means of an oven in which the vessels are placed. The core glass is melted in the innermost vessel while the cladding glass or glasses are melted in the vessel or vessels surrounding the central vessel.

At the fiber drawing temperature, the glasses in the vessels usually flow together from the apparatus (at least in part) by the gravitational force of the earth. The glasses are then drawn directly into a fiber. Depending on (i) the composition of the glasses (e.g. the presence of exchangeable cations), (ii) the operational temperature, and (iii) the time of contact, an exchange of cations between the core and the cladding glass may occur or diffusion of a cation from the core glass to the cladding glass or from the cladding glass to the core glass may occur. It is however also possible to manufacture stepped index fibers by the double crucible technique.

The melting vessels used in the double crucible method usually consist of platinum or quartz. At temperatures above 900° C. however, the use of platinum vessels is not practicable. Above 900° C. platinum becomes dispersed into the glass, predominantly via the gas phase. Moreover, platinum particles may become detached from the vessel wall and be carried along by the outflowing glass. In addition, at these temperatures impurities such as, for example, chromium, diffuse from the platinum into the glass melt.

Quartz glass vessels have problems of the same nature. Quartz glass will dissolve in the glass and impurities in the quartz glass will diffuse into the glass. Impurities and differences in concentrations will result in light absorption and scattering and consequently will result in an extra contribution to the attenuation of the light signal transmitted through the optical fiber, particularly if present at the interface of the core and the cladding glass. These effects have become increasingly important as glassforming starting materials have become available in increasingly higher purities and as the purity of the gas atmosphere surrounding the glass melt can be kept sufficiently under control.

Up to now comparatively low-melting glasses such as borosilicate, phosphosilicate and leadsilicate glasses have been used for the fabrication of optical fibers. However, for several reasons these glasses are not suitable for the production of optical fibers having a minimum attenuation or radiation of wavelengths between about 800 and 1500 nanometers.

Attenuation in optical fibers has different causes. For example attenuation may be caused by impurities which absorb light in the wavelength range of interest or by inhomogeneities in the glass which cause scattering. Impurities are either present in the starting materials or, as mentioned above, are introduced from the crucible material by diffusion. Macroscopic inhomogeneities cause a wavelength-independent scattering of the light. Submicron and atomic inhomogeneities cause a wavelength-dependent scattering which is commonly known as Rayleigh scattering. In high quality glasses the scattering consists predominantly of the atomic contribution to the Rayleigh scattering.

The Rayleigh scattering is inversely proportional to the fourth power of the wavelength of the light transmitted through the optical fiber. The Rayleigh scattering depends, for example, on the amount of heavy elements which are in the glass, for example in the form of their oxides. For this reason, particularly low attenuation cannot be reached when lead silicate glasses are used in a fiber. The same is true, although to a lesser extent, for glasses containing germanium oxide. Boron oxide causes attenuation at wavelengths longer than 1200 nanometers.

Moreover, a number of comparatively low-melting glasses proposed up to the present time are unstable (that is to say they have a tendency to devitrify) and they are not corrosion-resistant, particularly in a humid atmosphere. Corrosion is a considerable problem, for example, with phosphosilicate glasses.

Despite these problems, the use of low melting point glasses in the double crucible method is advantageous because at low temperatures the diffusion of impurities from the crucible wall into the glass is low and the rate of dissolution of platinum or quartz glass into the glass melt is also low.

SUMMARY OF THE INVENTION

It is an object of the invention to produce optical fibers having a low level of impurities at the interface between the core glass and the cladding glass by a double crucible method at operating temperatures which are higher than have been considered technically possible in the past.

A further object of the invention is to use glasses having a small Rayleigh scattering in the production of optical fibers. Such glasses usually must be heated to a higher operating temperature than glasses used in practice in the double crucible method in the past.

According to the invention, these objects are accomplished by means of a method in which at least the core glass is heated by means of a high-frequency electric field during fiber drawing. The glass is heated in a vessel of a material having low dielectric losses at the frequency of the field used. At the same time, the vessel is cooled to form a permanent layer of solid glass on the walls of the vessel.

Heating of the core glass to the operating temperature is effected by the heat generated by the high-frequency electric field by induction in the glass only. At room temperature, however, the electrical conductivity of most glasses is too low to enable the glasses to draw power from the high-frequency electric field. Therefore glasses usually are heated initially by other means until the conductivity has been increased sufficiently to enable the glass to draw power from the high frequency electric field. Then, the high frequency electric field is switched on to melt the glasses. Thereafter, the cooling is switched on.

The heating from room temperature may, for example, be effected by direct irradiation, by means of an oven, or by inserting a conducting member which is enveloped by quartz into the glass. The temperature to which the glass must be heated so as to be able to draw power from the field depends on the glass composition, the dimensions of the crucible, the shape and the number of windings of the coil, and on the frequency of the field. The higher the frequency of the field the lower the temperature to which heating must be done for a given composition and geometry of the crucible. In a practical embodiment, the starting materials are already in a vitreous form.

The method may be carried into effect with an apparatus which comprises a double-walled inner crucible or melting vessel. A cooling liquid is passed through the space enclosed by the double walls. Situated in the liquid there is a metal wire winding which couples the electric field to the glass melt present in the inner crucible. The material of the crucible and the cooling liquid are chosen so that the dielectric losses are low at the electric field frequency to be used. A suitable crucible material is quartz glass. Distilled water may be used as the cooling liquid.

In practice, it has been found that good results can be obtained with an electric field having a frequency between 1 and 10 MHz. In this respect the use of a liquid as the cooling agent must be preferred, as the heat capacity per $cm^3$ is greater than that of a gas and the heat transfer is better. Other suitable cooling liquids are, for example, transformer oils and Freon (trademark). Other suitable crucible materials are $Al_2O_3$, MgO, and glass.

When a double or multicrucible apparatus according to the invention is used, a comparatively cold layer of core glass is formed on the walls of the inner crucible wall. The temperature of this layer is lower than that of the bulk of the core and cladding glasses. The temperature gradient in this layer may be very steep (for example approximately 1000° C./mm).

This cold glass layer, which does not contribute to the structure of the optical fiber prevents impurities present in the crucible material from diffusing into the molten glasses and prevents dissolution of crucible material. This is particularly important for the inner crucible, as impurities coming from this crucible will contaminate the optically important interface between the core and the cladding glass. Such concentration, if allowed, may be up to twice the concentration of impurities if only the cladding glass is in contact with the inner wall surface of an outer crucible. This is because without the cold glass layer, at the interface two glasses come together which have been in contact with the outer and the inner walls of the crucible, respectively. Furthermore, the impurities in the outer portion of a cladding glass are present in an optically less important portion of the fiber.

The preparation of very pure glasses by melting a powdered raw material batch mixture in a water-cooled crucible using a high frequency electric field is known from U.S. Pat. No. 3,937,625. The glass compositions mentioned in this specification melt at temperatures below 1200° C. The crucible shown and described in the specification cannot be used in the method and apparatus according to the present invention as the metal windings are located outside of the double wall of the crucible.

So far as is known, it has not yet been proposed to heat the contents of the inner crucible (of concentrically arranged crucibles) by means of a high-frequency electric field. It is of course alternatively possible within the scope of the invention to heat the glass contained in an outer crucible by means of a high-frequency field and to cool this crucible. It is, however, advantageous to use an outer crucible of quartz glass which is heated by means of an oven. Although this results in $SiO_2$ being dissolved in the cladding material, the increase of $SiO_2$ at the surface of the optical fiber has no detrimental effect from the optical point of view. In fact, the optical fiber becomes more resistant to corrosion, particularly with respect to water. At the same time, as a result of the lower coefficient of thermal expansion of $SiO_2$, a compressive stress is built up in the formed layer resulting in a fiber having increased strength.

A similar effect may be obtained in case the outer crucible consists of a material other than quartz glass, such as alumina, magnesia, zirconia, yttria, titania, calcium zirconate or mixtures of two or more of such oxides or mixtures of one or more of such oxides with silica. Some of the crucible material will dissolve in the outer portion of the cladding glass, which may result in better resistance to corrosion and greater fiber strength.

The apparatus according to the invention has the advantage that the outflow rate of the glasses from the inner crucible and the outer crucible or crucibles can be kept constant in a simple way. The inner crucible remains comparatively cold and consequently maintains its strength. This means that the outflow rate can be controlled by controlling the gas pressure over the contents of the crucible. This holds of course also for the outflow rate of the glass from the outer crucible or crucibles. This is a great advantage compared with an apparatus in which the crucibles are made of platinum, as platinum rapidly loses its strength, particularly at elevated temperatures. It is possible, and in many cases even necessary, to apply different gas pressures to the glass in the inner crucible and to the glass in the outer crucible.

A further advantage of an apparatus according to the invention is that the glasses in the inner and the outer crucible can be kept at mutually different temperatures. It is now not only possible to match the viscosities of the core and cladding glasses by a careful selection of the glass compositions, but also by means of the temperature at which the glasses are kept. By controlling the outflow rates not only the fiber geometry (the ratio of the core diameter to the overall fiber diameter) but also the diffusion time can be controlled accurately, for example during the fabrication of graded index fibers. In this connection, diffusion time is understood to mean that period of time in which the glasses are in contact with each other at a sufficiently high temperature to achieve diffusion of material between the glasses.

According to a suitable embodiment of the invention the inner crucible has a comparatively large outflow opening. That is, the opening in the inner crucible has a diameter which is larger than the desired diameter of the glass stream flowing into the crucible enclosing the inner crucible. In this embodiment, the size of the outflow opening is determined by the quantity of solid glass forming on the bottom of the crucible around the outflow opening. This quantity depends on the extent of cooling and heating. In order to control the heating independent of the current intensity, the coil in the space enclosed by the double walls of the inner crucible is arranged so that it can be moved in the vertical direction. By having the coil descend deeper or shallower into this space, the outflow opening of the inner crucible can be adjusted without changing the cooling liquid flow rate.

If so desired the inner crucible may be in the form of a double-walled cylinder without a constriction.

According to a further embodiment of the method of producing optical fibers having an index which is commonly referred to as a graded index, use can be made of a double crucible having a long outflow pipe which is heated to a temperature which is advantageous for the diffusion of the cations in the core and cladding glasses. This outflow pipe, for example made of quartz, may also be heated directly, as absorption of contaminations from this tube is optically not harmful and as absorption of quartz by the fiber may even have a favorable influence on the strength thereof.

The outflow pipe may alternatively consist of ceramic material such as zirconia, yttria, titania, magnesia, alumina, calcium zirconate or mixtures of two or more of such oxides or mixtures of one or more of such oxides with silica. The material of the outflow pipe will slowly dissolve in the outer portion of the cladding glass which may result in better resistance to corrosion and greater fiber strength.

The method according to the invention offers the advantage that during fiber drawing there is no direct contact between either molten core glass or molten cladding glass and the walls of the inner crucible. Consequently, higher operational temperatures than have been hitherto possible and customary may be used for fiber manufacture. This opens the possibility of fabricating optical fibres from glasses from which fibers can be produced at comparatively high temperatures (T > 1200° C.) and the possibility of suppressing devitrification and phase separation, as a suitable glass composition can be chosen.

The possibility of using higher melting glasses also opens up the possibility of using cations other than the alkali-ions which have been predominantly used so far as exchanging ions, such as the exchange of Ca for Mg and Al for Y. It is of course alternatively possible to use the invention in the production of optical fibers which have more than one cladding. An apparatus is then used which comprises three or more concentrically arranged melting vessels or crucibles. The inner crucible or all crucibles, the outer crucible excepted, are then of a double-wall construction. Metal wire coils are provided in the spaces enclosed by the double walls with a cooling liquid optionally also present. Of course, if so desired, the outer crucible may also have a double wall and may be provided with a metal wire coil and cooling means.

DESCRIPTION OF THE PREFERRED EMBODIMENTS

Figure 1:
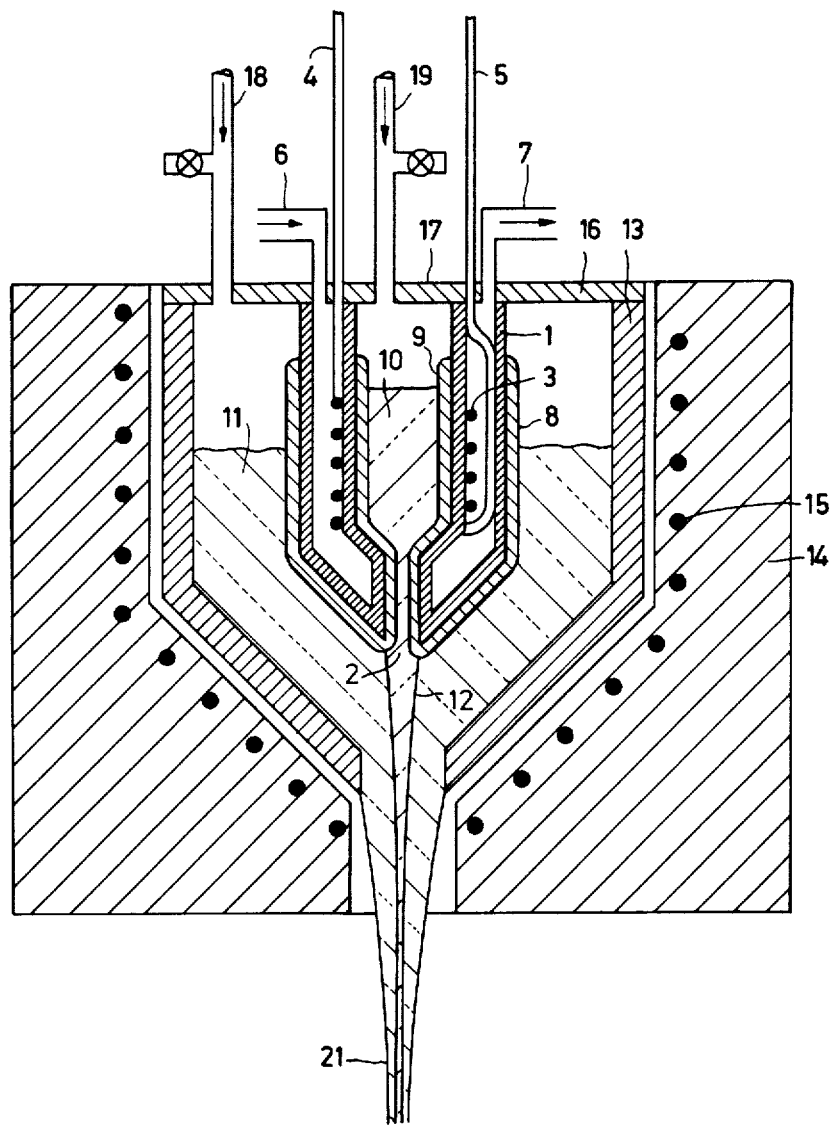
FIG. 1 is a cross-sectional view through a double crucible, in which the contents of the inner crucible are heated by means of a high-frequency electric field.

The apparatus shown in FIG. 1 includes a double-walled crucible 1 of quartz, the bottom of which is provided with an outflow opening 2. The space enclosed by the double wall of crucible 1 accommodates a coil 3 of copper wire and part of the current conductors 4 and 5. Through supply means 6 and discharge means 7 distilled water at ambient temperature (approximately 20° C.) is passed between the double walls as a cooling agent. For cooling the inner surface and the outer surface of crucible 1. The temperature of the crucible walls is kept at a value below the fiber drawing temperature of core glass 10 and cladding glass 11. A solid layer of glass 8 of the cladding glass 11 and a solid layer of glass 9 of core glass 10 is formed on the walls of crucible 1. These layers prevent crucible material from being dissolved in the two glasses 10 and 11, and they also prevent impurities from the walls of crucible 1 from diffusing into these glasses 10 and 11.

It is clear that during the fabrication of optical fibers by means of the apparatus of FIG. 1 the material at the interface 12 between the core and cladding glasses (which interface is critical from an optical point of view) is adequately protected at the fiber drawing temperature from contamination by crucible material and from impurities diffusing from the crucible material. This is true even if fiber drawing temperatures are used which are higher than the customary temperatures which have been used so far, whereby a wider choice of glass compositions become available. This is one of the most important advantages of the invention, as now glass compositions may be used which have a minimal intrinsic Rayleigh scattering in the interesting wavelength range (800—1500 nm).

In addition, the apparatus of FIG. 1 comprises an outer crucible 13 and an oven 14 having an electric resistance heating coil 15. After having been filled with, for example, glass frits of the compositions required for the respective core and cladding glasses, the two crucibles 1 and 13 are hermetically closed with the lids 16 and 17. Thereafter the electric field, the cooling and the oven 14 are switched on and the glass in the inner crucible 1 is heated by irradiation (not shown) until the glass starts absorbing power from the field. By controlling the gas pressure in the crucibles over the glasses (for which gas inlet pipes 18 and 19 are provided), the outflow rates from the crucibles 1 and 13 can be controlled. The glass flowing from the crucibles is drawn into a fiber 21 in the conventional way.

Figure 2:
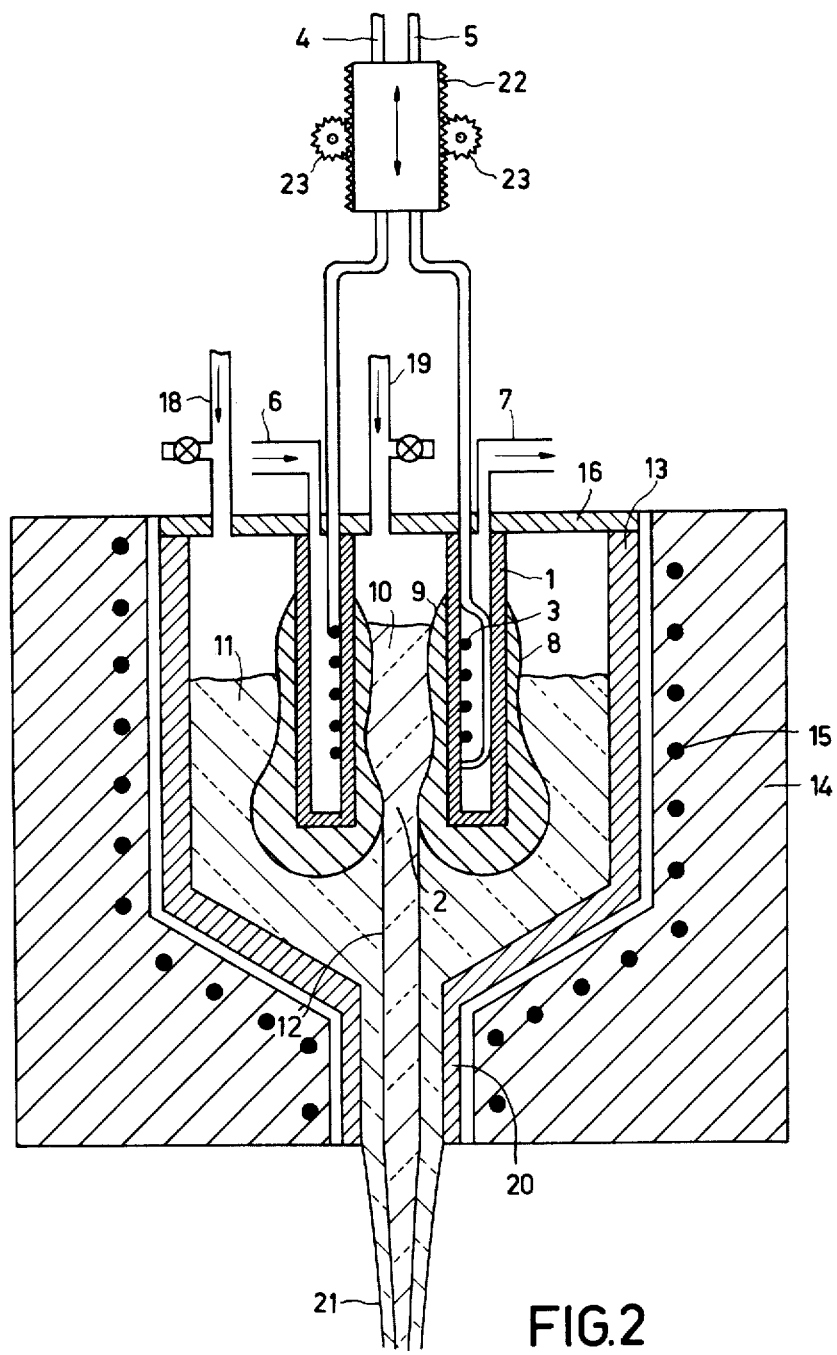
FIG. 2 is a cross-sectional view through another embodiment according to a double crucible of the invention.

In the apparatus which is schematically shown in FIG. 2, the inner crucible 1 has a cylindrical shape. The reference numerals have the same meaning as in FIG. 1. The outer crucible is provided with a longer outflow channel 20, which is also heated by the oven 14. By locating the metal wire winding 3 deeper or shallower in the space enclosed by the double wall of crucible 1 (using a device such as the rack 22 and the pinions 23) the thicknesses of the layers of solid glasses 8 and 9, particularly at the bottom, can be controlled, which determine the diameter of the outflow opening 2 and consequently the diameter ratio between the core glass and the overall diameter of the fiber 21.

What is claimed is:

1. A method of fabricating optical fibers comprising a core glass and a cladding glass, said method comprising the steps of:
    providing first and second crucibles, the first crucible being within the second crucible, each crucible having an outlet opening;
    providing a core glass within the first crucible and providing a cladding glass within the second crucible;

heating the core glass and the cladding glass;

flowing the heated core glass through the outlet opening of the first crucible and through the cladding glass to produce a composite of the core glass surrounded by the cladding glass; and flowing the composite glass through the outlet opening of the second crucible and drawing the composite glass to produce an optical fiber;

characterized in that:

the core glass is heated by a high-frequency electric field;

the first crucible is made of a material having low dielectric losses at the frequency of the electric field; and the first crucible is cooled to form a layer of solid glass thereon while the core glass is heated.

2. A method as claimed in claim 1, characterized in that the flow rates of the core and cladding glasses out of the outlet openings are controlled by applying a controlled gas pressure to the contents of each crucible.

3. An apparatus for fabricating optical fibers comprising a core glass and a cladding glass, said apparatus comprising:

first and second crucibles, the first crucible being arranged within the second crucible, each crucible having an outlet opening, the outlet openings being arranged on an axis; and means for heating the contents of the first and second crucibles;

characterized in that:

the first crucible has a double-wall construction with a space inside the double-wall;

the heating means for heating the contents of the first crucible comprises an electrically conducting coil arranged in the space inside the double-wall; and the apparatus further comprises means for passing a cooling fluid through the space inside the double-wall.

4. An apparatus as claimed in claim 3, characterized in that the first crucible is made of quartz.

5. An apparatus as claimed in claim 4, characterized in that the apparatus further comprises means for moving the coil, within the space inside the double-wall, closer to or further from the outlet opening in the first crucible.

* * * * *